United States Patent
Mudd

(10) Patent No.: US 9,268,100 B2
(45) Date of Patent: Feb. 23, 2016

(54) FIBER OPTIC CONNECTOR ADAPTER

(71) Applicant: CommScope, Inc. of North Carolina, Hickory, NC (US)

(72) Inventor: Ronald L. Mudd, Sachse, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 307 days.

(21) Appl. No.: 13/802,873

(22) Filed: Mar. 14, 2013

(65) Prior Publication Data

US 2014/0133821 A1    May 15, 2014

Related U.S. Application Data

(60) Provisional application No. 61/725,219, filed on Nov. 12, 2012.

(51) Int. Cl.
*G02B 6/38* (2006.01)

(52) U.S. Cl.
CPC ............ *G02B 6/3825* (2013.01); *G02B 6/3878* (2013.01)

(58) Field of Classification Search
CPC ...................... G02B 6/3825; G02B 6/3878
USPC .................................................. 385/134, 136
See application file for complete search history.

(56) References Cited

U.S. PATENT DOCUMENTS

| 4,140,365 | A |   | 2/1979 | Burger et al. |
|---|---|---|---|---|
| 4,478,487 | A | * | 10/1984 | Obeissart ............. G02B 6/3821 385/66 |
| 4,690,494 | A | * | 9/1987 | Hirose et al. .................... 385/60 |
| 5,603,631 | A |   | 2/1997 | Kawahara et al. |
| 5,774,611 | A | * | 6/1998 | Nagase et al. .................. 385/58 |
| 5,815,618 | A | * | 9/1998 | Takahashi et al. .............. 385/60 |
| 8,297,850 | B2 | * | 10/2012 | Nishioka et al. ................ 385/60 |
| 2006/0147156 | A1 |   | 7/2006 | Tsuchida et al. |

FOREIGN PATENT DOCUMENTS

WO    WO 2013/112451 A1    8/2013

* cited by examiner

*Primary Examiner* — Daniel Petkovsek
(74) *Attorney, Agent, or Firm* — Muncy, Geissler, Olds & Lowe, P.C.

(57) ABSTRACT

A fiber optic adapter includes a mounting block having a first opening and a through opening extending into the mounting block from the first opening with a seat for receiving a body portion of a fiber optic connector and at least one flexible projection with a first end defining an aperture that is smaller than the first opening. The at least one flexible projection is configured to flex away from a rest position and away from a longitudinal axis of the through opening to allow the body portion of the fiber optic connector to reach the seat and configured to return toward the rest position when the fiber optic connector reaches the seat and to substantially prevent the removal of the fiber optic connector in a direction opposite its insertion direction when the at least one flexible projection is in the rest position.

19 Claims, 6 Drawing Sheets

FIBER OPTIC CONNECTOR ADAPTER

CROSS-REFERENCE TO RELATED APPLICATIONS

The present application claims the benefit of U.S. Provisional Patent Application No. 61/725,219, filed Nov. 12, 2012, the entire contents of which are hereby incorporated by reference.

FIELD OF THE INVENTION

The present invention is directed toward an adapter for holding a fiber optic connector, and, more specifically, toward an adapter having at least one flexible internal projection that allows a fiber optic connector to be inserted into the adapter through a first opening in a first direction and that substantially prevents the fiber optic connector from being removed from the first opening in a second direction opposite the first direction.

BACKGROUND OF THE INVENTION

Various types of modules are known for enclosing optical fibers, and, in particular, for enclosing locations at which optical fibers are spliced or joined using connectors. For example, a fiber optic fan-out module is a product used in networks to split optical signals from a high density cable into individual fibers and to provide connectors for connecting each of the individual fibers to other fibers. A high density cable enters one portion of the module, and the individual fibers are separated inside the module and terminated with connectors. The connectors in turn are mounted in adapters that hold the connectors in a suitable position to mate with other connectors inserted into an opposite side of the adapter from outside the module. These modules may be mounted in a patch panel in a rack in a datacenter or other location where optical fiber interconnections are needed.

Generally, customers would like fan-out modules to be as small as reasonably possible in order to increase density in a patch panel. One limiting feature of the modules that makes reducing their size difficult is the size of the fiber optic adapters and connectors used inside the modules. Often, the same type of connector is used inside a module as is used outside of the module, and these conventional connectors include, among other elements, a ferrule, a spring push, a spring and a connector body holding the ferrule, spring and spring push. These elements perform useful functions outside a module but are not always needed for connections inside a module. It would therefore be desirable to provide a more compact adapter arrangement for holding connectors in locations such as the interiors of optical fiber fan-out modules.

SUMMARY OF THE INVENTION

These and other problems are addressed by embodiments of the present invention, a first aspect of which comprises a fiber optic adapter that includes a mounting block having a first side having a first opening and a second side having a second opening and a through opening from the first opening to the second opening with a longitudinal axis. The through opening includes a seat for receiving a body portion of a fiber optic connector inserted into the mounting block through the first opening, and there is at least one flexible projection in the through opening that has a first end defining an aperture in the through opening between the first opening and the seat. The aperture is smaller than the first opening. The at least one flexible projection is configured to flex away from a rest position and away from the longitudinal axis to allow the body portion of the fiber optic connector to move from the first opening to the seat, and the at least one flexible connection is configured to return toward the rest position when the fiber optic connector reaches the seat. The at least one flexible projection is also configured to substantially prevent the removal of the fiber optic connector through the first opening when the at least one flexible projection is in the rest position.

Another aspect of the invention comprises a fiber optic adapter that includes a mounting block having a first side having a first opening and a second side having a second opening and a through opening from the first opening to the second opening with a longitudinal axis. The through opening includes means for limiting movement of a fiber optic connector in the through opening in a direction from the first opening toward the second opening, and there are securing means in the through opening for allowing a fiber optic connector to be inserted into the through opening from the first opening while blocking the removal of the fiber optic connector through the first opening.

A further aspect of the invention comprises a fiber optic adapter including a cap having a first wall and a second wall and a plurality of through openings each extending from the first wall to the second wall. Each of the through openings includes a first opening in the first wall, a second opening in the second wall, a longitudinal axis, and a tapered portion inward of the first opening that extends toward the longitudinal axis and forms a seat. The through openings also have a sleeve-receiving portion extending inwardly from the second opening and a narrow portion between the sleeve-receiving portion and the tapered portion. The diameter of the narrow portion is less than the smallest diameter of the sleeve-receiving portion and less than the smallest diameter of the tapered portion. A retainer is mounted against the cap, and the retainer includes a first wall spaced from the cap that has a first orifice, and at least one projection projects from the retainer toward the cap. The at least one projection defines an aperture having a diameter less than a diameter of the first opening.

BRIEF DESCRIPTION OF THE DRAWINGS

These and other aspects and benefits of the present invention will be better understood after a reading of the followed detailed description together with the attached drawings wherein.

DETAILED DESCRIPTION

Figure 1:
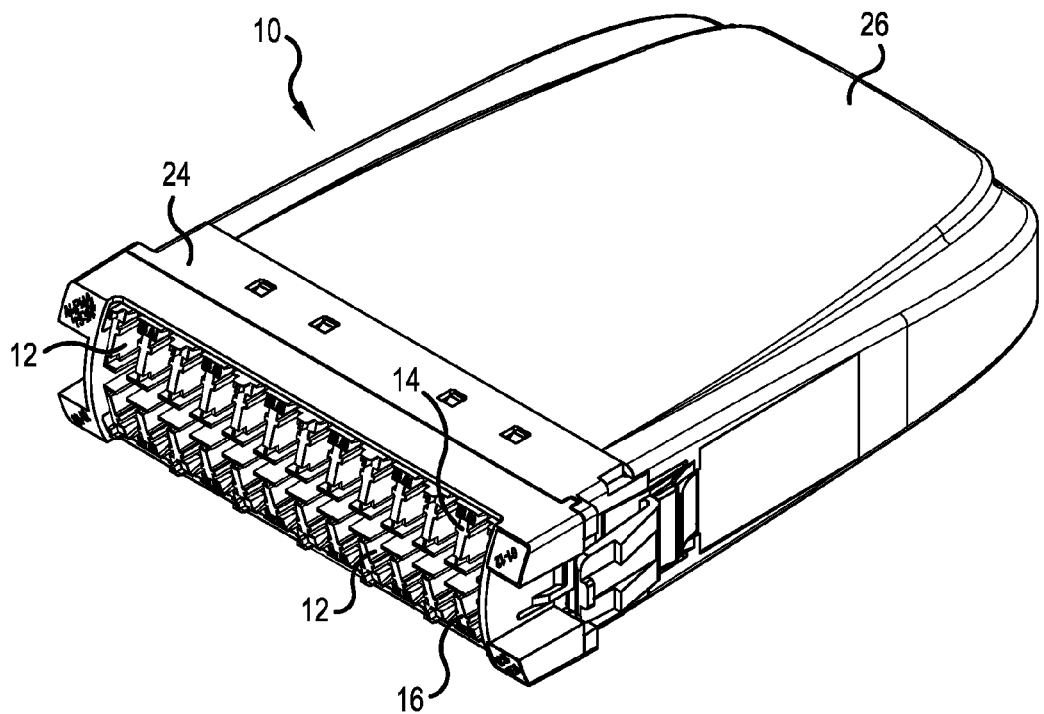
FIG. 1 is front perspective view of a fan-out module having an adapter according to an embodiment of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 2:
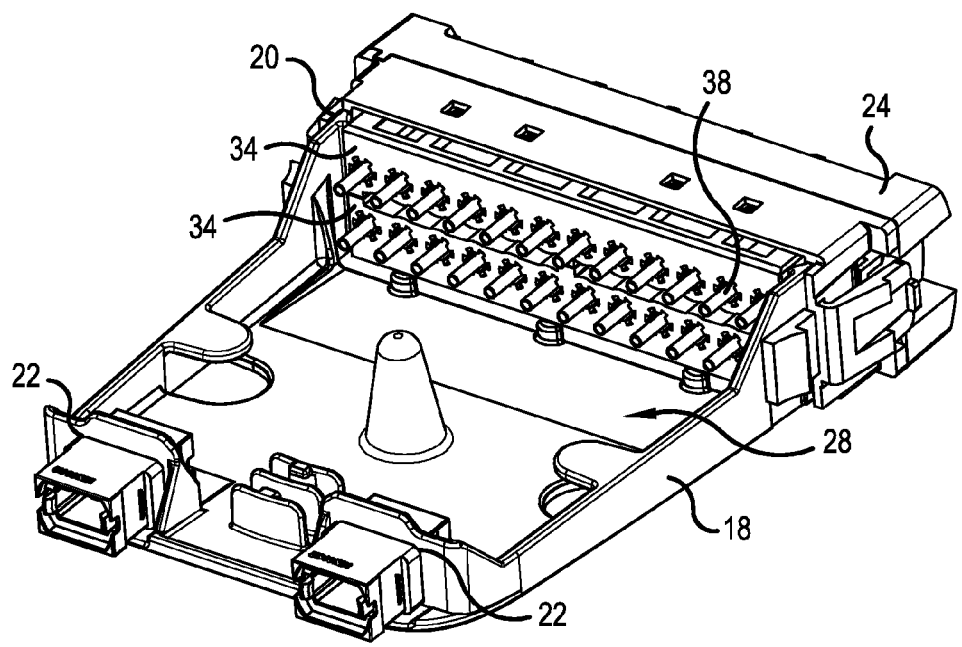
FIG. 2 is a rear perspective view of the fan-out module of FIG. 1 with its cover removed.

FIG. 1 shows a fiber optic fan-out module 10 having twenty four ports 12 arranged in an upper row 14 and a lower row 16 at a front side of the fan-out module 10. Individual fiber optic connectors (not illustrated) which may comprise, for example, LC, FC, SC, ST, MU, E-2000, or E-3000 connectors, may be removably inserted into the ports 12 to connect various components outside the fan-out module 10 to fibers inside the fan-out module 10. As illustrated in FIG. 2, the fan-out module 10 includes a chassis 18 having a front opening 20, first and second rear openings 22 for connecting trunk cables (not illustrated) to the chassis 18, a bezel 24 mounted at the front opening 20 (the ports 12 being located in the bezel 24), and a cover 26 removably mounted on the chassis 18 and defining with the chassis 18 an interior 28 that houses and protects individual fibers from the trunk cables as they fan out inside the fan-out module 10. The fan-out module 10 is mountable on a shelf or rack (not illustrated) in a conventional manner.

Figure 3:
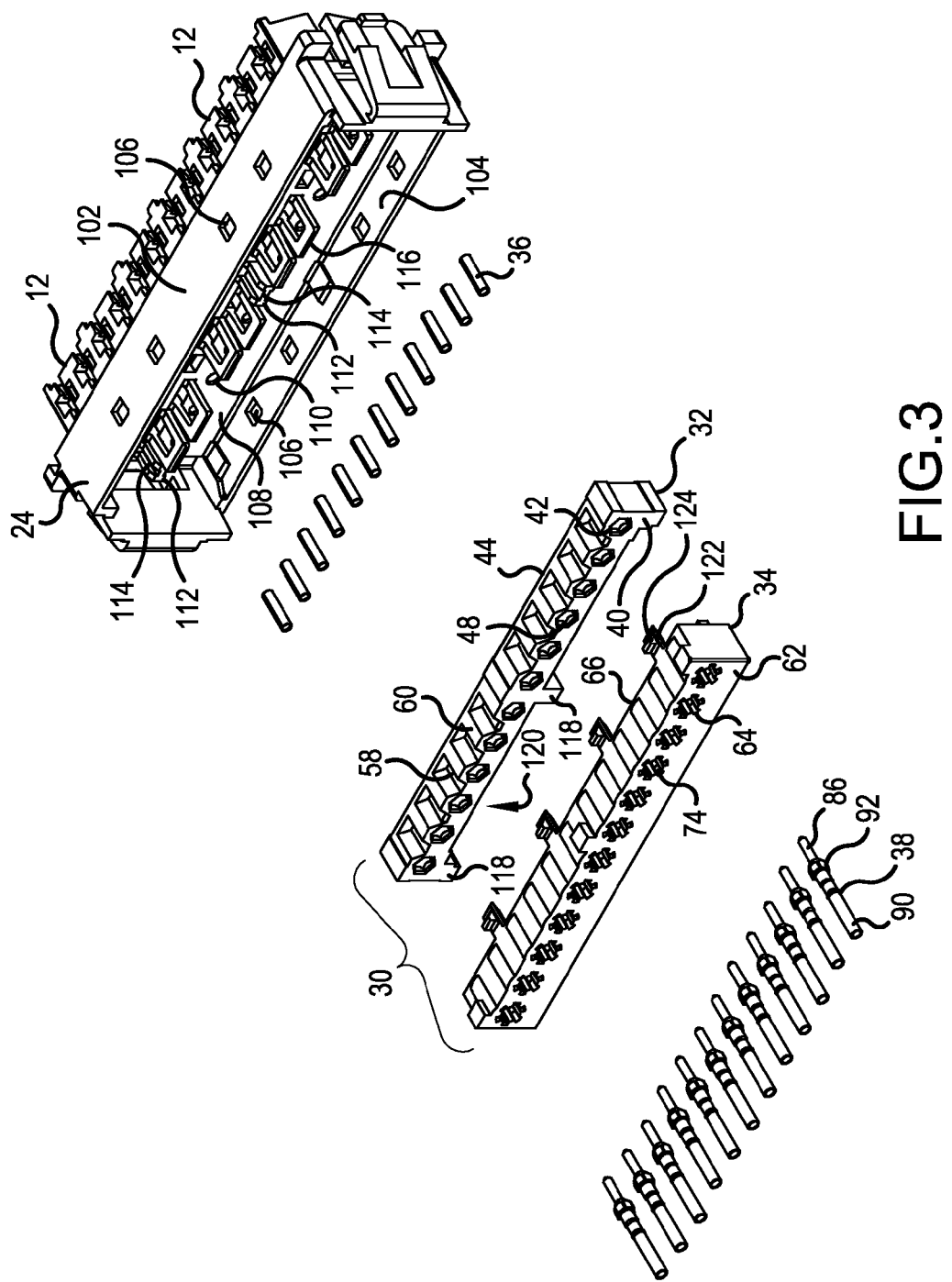
FIG. 3 is an exploded perspective view of cap and a retainer that form the adapter of FIG. 1 along with optical connectors, connector sleeves and a bezel portion of the fan-out module to which the adapter is connectable.

FIG. 3 is an exploded view of the bezel 24, a mounting block 30 formed from a cap 32 and a retainer 34, a plurality of sleeves 36 and a plurality of connectors 38. First and second retainers 34, and portions of the connectors 38 projecting therefrom, are illustrated in FIG. 2. The mounting block 30 is illustrated as two separable elements, the cap 32 and the retainer 34 and is generally formed from two pieces for ease of manufacture. However, the mounting block 30 could be formed from a unitary body or from multiple elements permanently fastened to one another without exceeding the scope of the present invention. Elements of the cap 32 or retainer 34 described hereinafter can also be described as elements of the mounting block 30 formed by the cap 32 and retainer 34 together. The following description will generally discuss the cap 32 and the retainer 34 individually to help identify locations of various parts of the mounting block 30.

Figure 4:
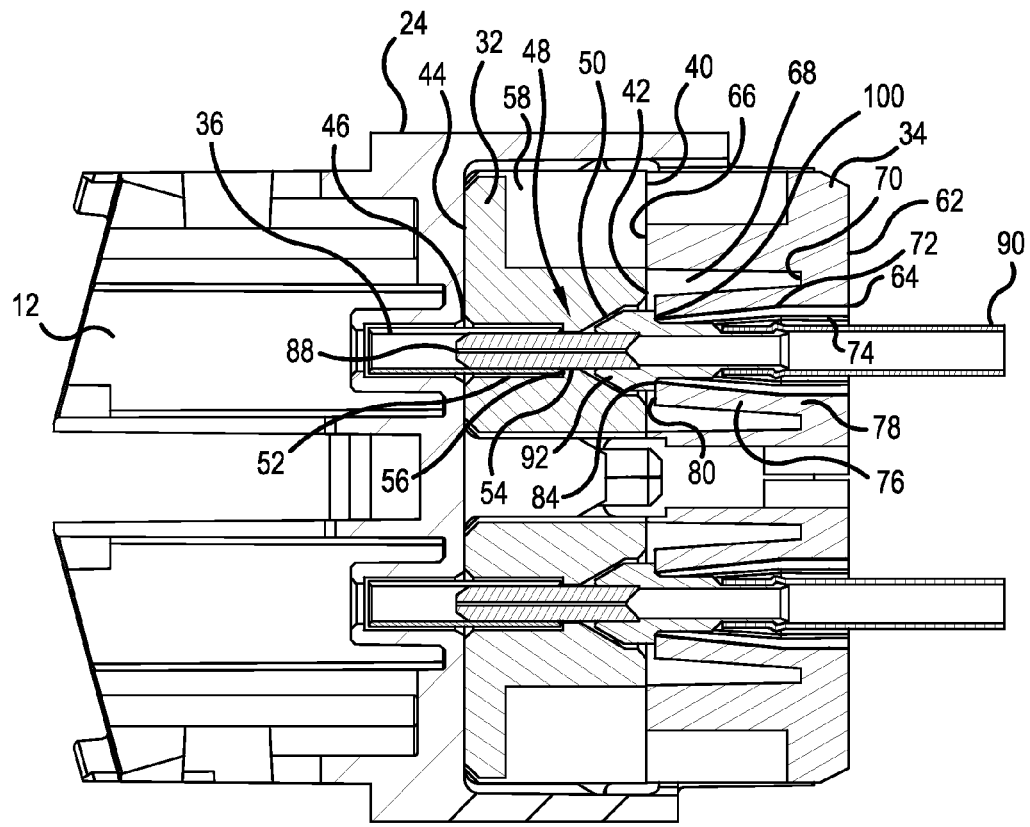
FIG. 4 is a sectional side elevational view of the adapter of FIG. 3 mounted in the bezel portion of the fan-out module and shows two connectors mounted in the adapter.

With reference to FIGS. 3 and 4, the cap 32 includes a first wall 40 having a plurality of first openings 42, a second wall 44 having a plurality of second openings 46, through openings 48 extending through the cap 32 from the first openings 42 to the second openings 46. Each of the through openings 48 includes a tapered portion 50 beginning at or near the first opening 42 that forms a seat for one of the connectors 38, a sleeve-receiving portion 52 extending inwardly from the second wall 44 and a narrow portion 54 between the tapered portion 50 and the sleeve-receiving portion 52 which is narrower that any portion of either the tapered portion 50 or the sleeve-receiving portion 52. The sleeve-receiving portion 52 of the through opening 48 transitions to the narrow portion 54 at a shoulder 56. The cap 32 also includes a plurality of slots 58 in a third wall 60 between the first wall 40 and the second wall 44.

The retainer 34 includes a first wall 62 having a plurality of first orifices 64 and a second wall 66 having a plurality of bores 68 therein, each bore having a bore bottom wall 70 and a second orifice 72. A passageway 74 extends from each of the first orifices 64 to each of the second orifices 72 and is coaxial with the bore 68. Each bore 68 also includes a plurality of flexible projections 76 with first ends 78 at the bore bottom wall 70 around the second orifice 72 and second or free ends 80 spaced from the bore bottom wall 70. The distance between the second ends 80 and a longitudinal axis of the bore 68 is less than a distance from the first ends 78 to the longitudinal axis of the bore 68; in other words, the projections 76 are angled toward the longitudinal centerline of the bore 68 and/or the longitudinal centerline of the passageway 74. The free ends 80 of the projections 76 thus define an aperture 84 that has a diameter smaller than the diameter of the first orifice 64 and the second orifice 72. As discussed hereinafter, the flexible projections 76 are configured to flex away from the longitudinal axis when an object larger than the aperture 84 is pressed against the projections 76 from the direction of the first orifice 64 and to return toward or to their starting locations when that object has passed through the aperture 84.

Figure 5:
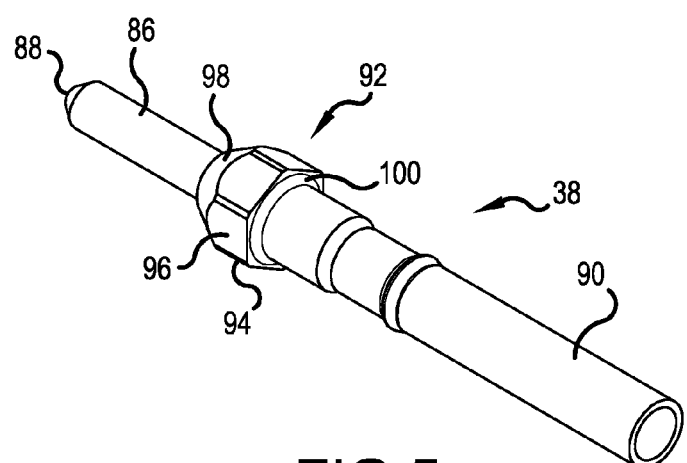
FIG. 5 is a perspective view of one of the connectors of FIG. 3.

One of the connectors 38 is illustrated in FIG. 5 separate from the mounting block 30. The connector 38 includes a distal portion 86 having an end 88, a main portion 90 that connects to an optical fiber from a trunk cable, and a body 92 between the distal portion 86 and the main portion 90 that has a larger diameter than either the distal portion 86 or the main portion 90. The body 92 includes a hexagonal side wall 94 having six generally planar surfaces 96, a tapered wall 98 between the side wall 94 and the distal portion 86 and a stop wall 100 generally perpendicular to the longitudinal axis of the main portion 90 that extends from the main portion 90 to the side wall 94.

The bezel 24 includes a top wall 102 and a bottom wall 104 each having a plurality of latching openings 106. The bezel 24 also includes an interior wall 108 having a plurality of openings 110 that align with each of the ports 12. Three channel members 112, two at opposites sides of the bezel 24 (only one of which is visible in FIG. 3) and one in the middle of the bezel 24, project from the interior wall 108, and each of the channel member 112 includes a longitudinal channel 114. A plurality of U-shaped brackets 116 also project from the interior wall 108 in first and second rows generally parallel to the bezel top wall 102 and bottom wall 104. The channel members 112 and U-shaped brackets 116 serve as supports for the cap 32 and the retainer 34 as described below.

Figure 6:
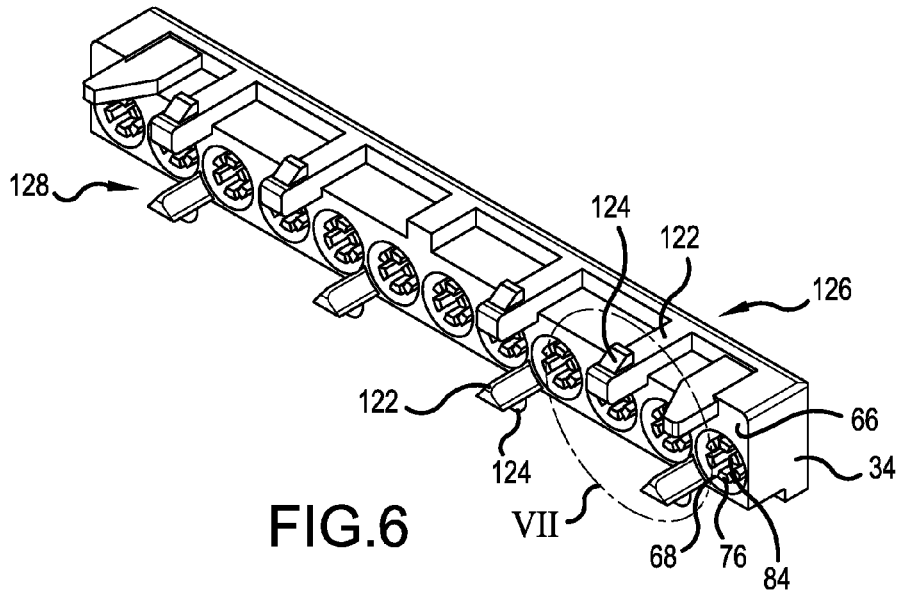
FIG. 6 is a perspective view of the retainer of FIG. 3.

As illustrated in FIG. 3, the cap 32 includes three legs 118 projecting from the bottom of the cap 32, the term "bottom" being used with respect to the orientation of the cap 32 in FIG. 3. The legs 118 are separated from one another by first and second gaps 120. The retainer 34 includes a plurality of arms 122 having barbed ends 124 that project from the second wall 66 of the retainer 34. FIG. 6 shows a first row 126 of four of these arms 122 projecting along one side of the second wall 66 on one side of the bores 68 and a second row 128 of these arms 122 projecting along an opposite side of the second wall 66 on the opposite side of the row of bores 68 from the first row 126.

The assembly of the cap 32, retainer 34 and bezel 24 and the insertion of a connector 38 into the mounting block 30 thus formed are described below. With reference to FIG. 3, one of the sleeves 36 is inserted into each of the openings 110 in the interior wall 108 of the bezel 24 until it reaches a stop 111 in the opening 110 leaving approximately half of the sleeve 36 projecting from the opening 110 into the interior of the bezel 24. Next a cap 32 is inserted into the bezel 24 so that each of the legs 118 of the cap 32 is slidably received in the longitudinal channels 114 of the channel members 112. The cap 32 is moved into the bezel until second wall 44 of the cap 32 reaches the projecting portions of the sleeves 36 at which point the sleeves 36 enter the sleeve-receiving portions 52 of the through opening 48 in the cap 32. The cap 32 is pressed further into the bezel 24 until the second wall 44 of the cap 32 contacts the interior wall 108 of the bezel and the sleeves 36 reach the shoulders 56 in the sleeve-receiving portions 52 of the through openings 58. A second cap 32, illustrated in FIG. 2, is inserted into the bezel 24 in a similar manner, but with its legs 118 facing "up" in FIG. 3 and engaging the longitudinal channels 114 on the bottoms of the channel members 112.

Next, a retainer 34 is inserted into the bezel 24 toward the cap 32. As the retainer 34 enters the bezel 24, the first row 126 of arms 122 on the retainer 34 extend into the slots 58 in the third wall 60 of the cap 32 and along the inside of the top wall 102 of the bezel 24 to one of the latching openings 106 in the top wall 102 whereat the barbed ends 124 of the arms 122 enter the latching openings 106. At the same time, the second row 128 of arms 122 engage the U-shaped brackets 116 extending from the interior wall 108 beneath the cap 32, and the barbed ends 124 of the second row 128 of arms 122 engage the interiors of each of the U-shaped brackets 116. In this manner, the retainer 34 snaps into place with its second wall 66 abutting the first wall 40 of the cap 32, and the retainer 34 holds the cap 32 against the interior wall 108 of the bezel 24 with the passageways 74 of the retainer 34 aligned with the through openings 48 of the cap and the openings 110 in the interior wall 108, and thus the ports 12, in the bezel 24. The second retainer 34 in inserted beneath the first retainer 34 in a similar manner, and the barbed ends 124 of the arms 122 of the second retainer engage the latching openings 106 in the bottom wall 104 of the bezel.

FIG. 4 shows the assembled bezel 24, cap 32 and retainer 34 in section, and the insertion of one of the connectors 38 into the mounting block 30 formed by the cap 32 and retainer 34 is described below with reference to FIG. 4. To connect one of the connectors 38 to the cap and retainer and position the end 88 of the distal portion 86 of the connector 38 for proper mating with a connector inserted in one of the ports 12, the distal portion 86 is inserted into the first orifice 64 of the retainer through the passageway 74 and toward the aperture 84 formed by the flexible projections 76. As the connector 38 moves further into the retainer 34, the distal portion 86 moves through the aperture 84 and into the first opening 42 of the cap 32. The distal portion 86 has a small enough diameter to pass through the narrow portion 54 of the through opening 48 and into the sleeve 36 in the sleeve-receiving portion 52 of the through opening 48. Meanwhile, as the distal portion 86 of the connector 38 is moving into the cap 32, the tapered wall 98 of the connector 38 engages the flexible projections 76 because the diameter of the body 92 of the connector 38 is larger than the diameter of the aperture 84. A person inserting the connector 38 will feel some resistance at this point, but with increased force, can continue to press the connector 38 into the retainer 34 so that the tapered wall 98 presses the flexible projections 76 away from the centerline of the passageway 74 allowing the hexagonal side wall 94 of the body 92 to pass through the aperture 84. After the hexagonal side wall 94 has passed through the aperture 84, the flexible projections 76 flex back toward the longitudinal centerline of the passageway 74. As the tapered wall 98 of the connector 38 reaches and is seated in the seat formed by the tapered portion 50 of the through opening 48 in the cap 32, the distal end 88 of the distal portion 86 of the connector 38 passes beyond the first wall 40 of the cap 32 to a location suitable for connecting to a connector (not illustrated) in one of the ports 12.

Because the aperture 84 is smaller than the diameter of the body 92 of the connector 38, the stop wall 100 of the connector 38 will engage the second ends 80 of the flexible projections 76 if the connector 38 is pulled away from the bezel 24, to the right in FIG. 4, and the flexible projections 76 thus allow the insertion of the connector 38 into the mounting block 30 while substantially preventing its removal therefrom, at least without using a tool 130 configured for this purpose and discussed below. Preferably there is a small gap between the second ends 80 of the flexible projections 76 and the stop wall 100 when the connector 38 is fully seated in the cap 32. Connectors (not illustrated) that are inserted into ports 12 generally include a spring-loaded end portion, and it is desirable to provide some play in the interior of the retainer 34 so that the spring loaded connector will press the stop wall 100 of the connector 38 away from the seat formed by the tapered portion 50 of the through opening and hold it against the second ends 80 of the flexible projections 76 during use.

Figure 8:
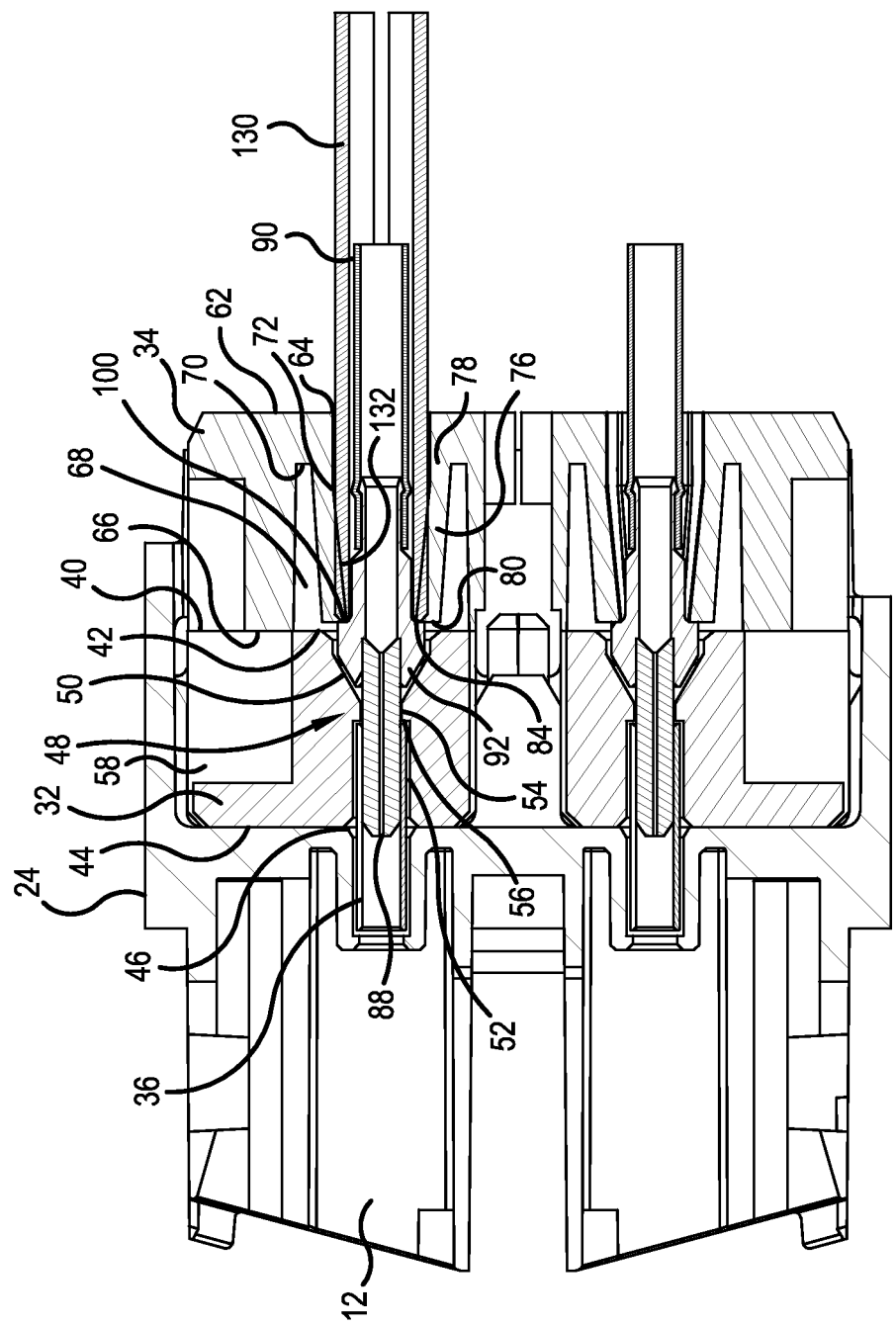
FIG. 8 is a sectional side elevational view of the adapter of FIG. 4 with a release tool inserted in the adapter to allow one of the connectors to be removed from the adapter.

FIG. 8 illustrates a tool 130 being used to release a connector 38 from the retainer 34. As illustrated in FIG. 8, the tool 130 is tubular and includes an inner diameter slightly larger than the outer diameter of the body 92 of the connector 38 and has an outer wall that tapers toward its distal end 132. Although not illustrated, the tool 130 may comprise two halves to allow it to be assembled around the main portion 90 of the connector 38. To remove one of the connectors 38, the tool is placed around the main portion 90 of the connector 38 to be removed and pressed into the first orifice 64. The tool 130, having an outer diameter larger than the aperture 84, presses the flexible projections 76 away from the centerline of the passageway 74 until the hexagonal side wall 94 of the connector 38 enters the end of the tool 130. With the hexagonal side wall 94 inside the tool 130 and the flexible projections 76 moved to make the aperture 84 larger than the diameter of the hexagonal side wall 94, the connector 38 can be pulled backwards into the tool 130, and the tool 130 and connector 38 can be removed from the retainer 34. However, as discussed above, a tool is not required for inserting the connectors 38 into the mounting block 30.

Figure 7:
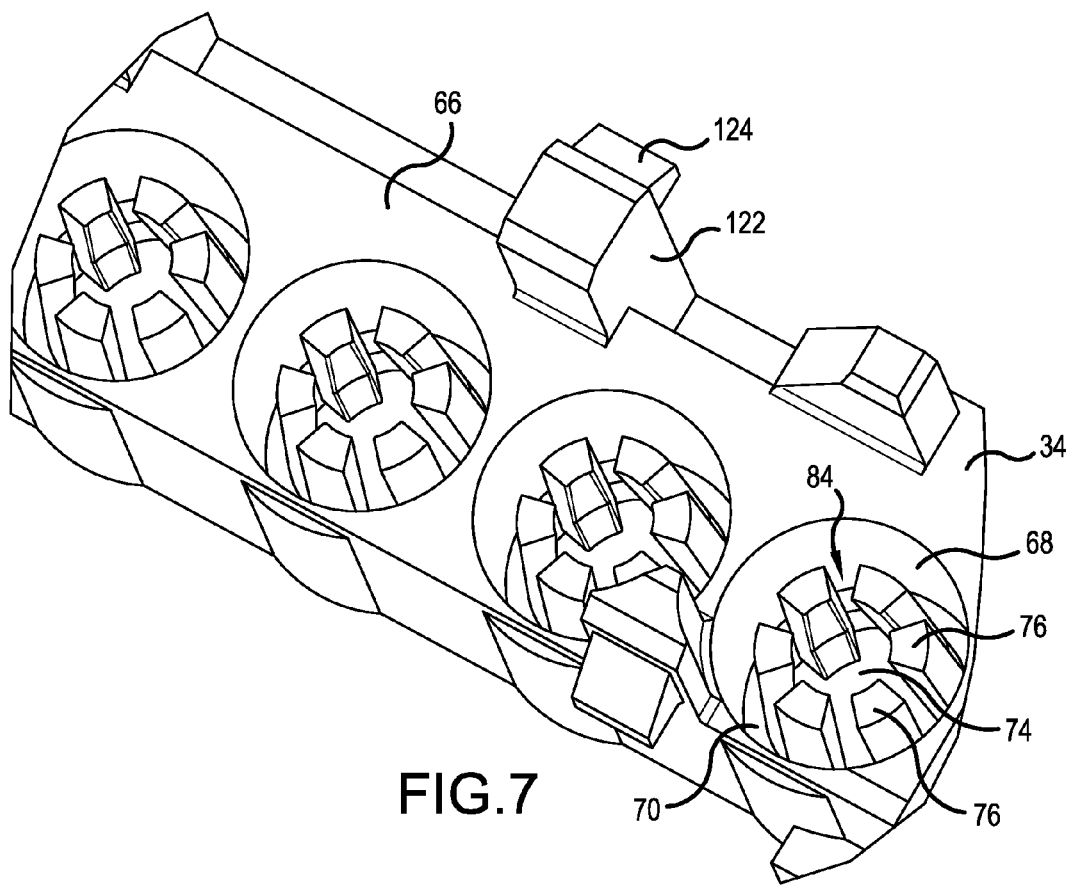
FIG. 7 is a detail view of region VII-VII of FIG. 6.

FIG. 7 illustrates an arrangement of six flexible projections 76, in this case in the form of fingers, defining the aperture 84. The spaces between the flexible projections 76 generally correspond to the locations at which the planar surfaces 94 of the body 92 meet one another—the vertices of the hexagon-shaped body 92. In addition, as illustrated in FIG. 3, the first orifices 64 in the retainer 32 are preferably shaped like a hexagon or at least include portions configured to allow the passage of a hexagonal body 92 of a connector 38 in a particular orientation. A connector 38 inserted into the first orifice 64 will thus pass through the passageway 74 with one of the planar surfaces 96 of the body 92 in contact with one of the flexible projections 76. However, the number, shape and arrangement of flexible connectors 76 can be varied depending on factors such as ease of manufacture and/or the shape of the connector that is being retained.

Figure 9:
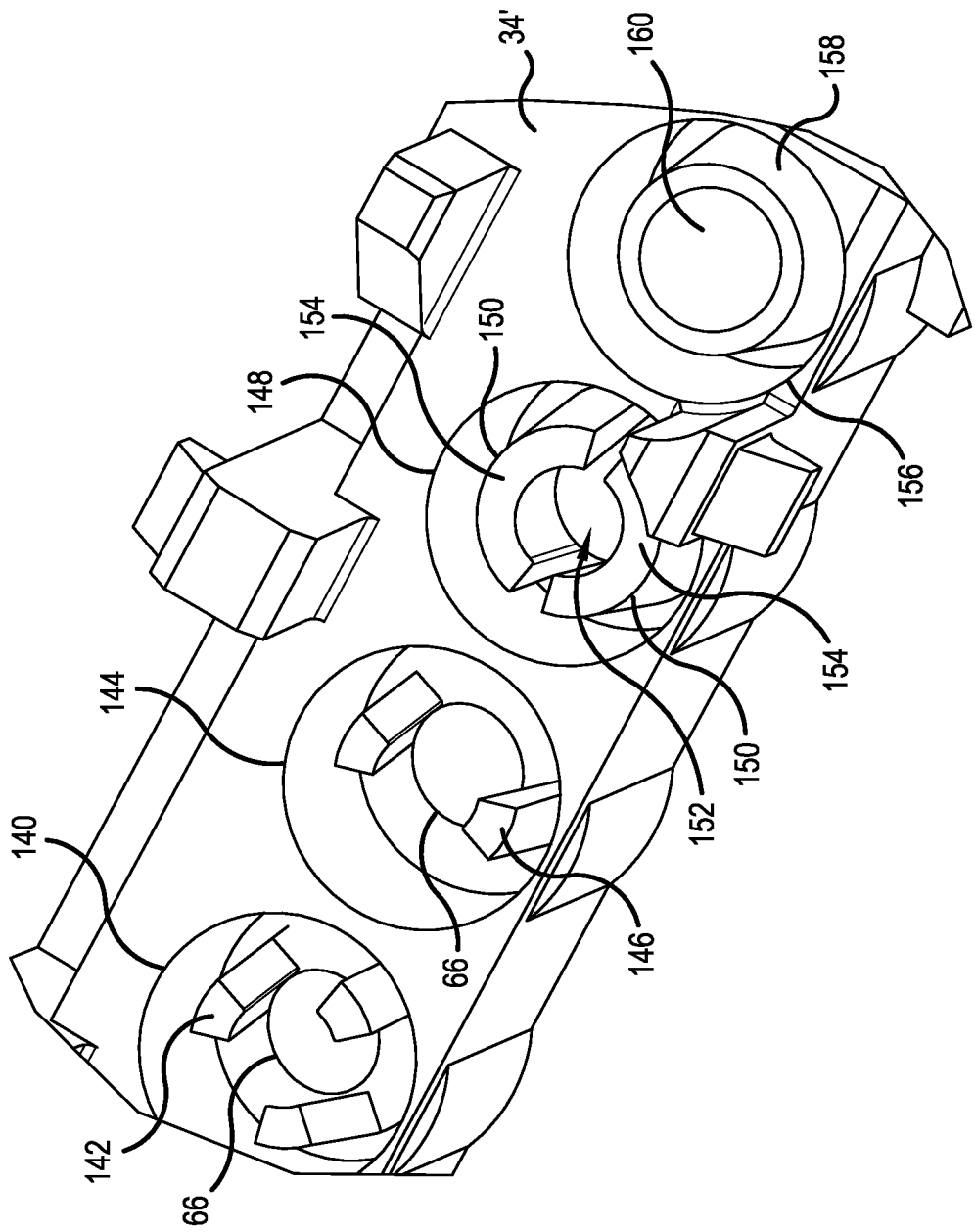
FIG. 9 is a retainer having retaining elements according to additional embodiments of the invention.

FIG. 9 illustrates alternate arrangements of the flexible projections 76. Four different arrangements of flexible projections 76 are illustrated in a single retainer 34' in FIG. 9; however, in general, a retainer would use the same arrangement of flexible projections 76 in all bores 82 as illustrated in FIG. 7. The four different configurations are illustrated in a single retainer 34' for purposes of illustration only.

The only difference between the structures in FIG. 9 and the structures in, for example, FIG. 7, is the shape and/or arrangement of the one or more flexible projections in the retainer 34'. The four bores and the flexible projections of FIG. 9 will be identified with different reference numbers primarily to allow easy identification of the portion of FIG. 9 that is being addressed.

The first bore 140 of the retainer 34' includes three flexible projections 142, in the form of fingers, evenly spaced around the periphery of the second orifice 66 in the retainer 34. These flexible projections 142 could be used with one of the connectors 38 or with a connector having a body portion with an alternate configuration. The three flexible projections 142 require less material to mold and may provide a preferable arrangement securing some connector configurations.

The second bore 144 of the retainer 34' includes only first and second flexible projections 146, also in the form of fingers, located on opposite sides of the periphery of the second orifice 66. This arrangement may also be used to secure one of the connectors 38 or may be well suited for an alternate connector (not illustrated) shaped to securely engage these two flexible projections 146.

The third bore 148 of the retainer 34' includes first and second flexible projections 150 that have a shape substantially different than the flexible fingers discussed above. Each of the flexible projections 150 resembles one half of the outer surface of a truncated cone. The aperture 152 formed by the free ends 154 of these structures opens and closes like a mouth when a connector 38 or other connector (not illustrated) is inserted through the aperture 152. The flexible projections 150 of the third bore 148 could be used with connectors having various different shapes or with a connector configured to be aligned with the gap between the projections 150.

The fourth bore 156 includes a single flexible projection 158 in the form of a truncated, hollow, cone that extends from the periphery of the second orifice 66 to an aperture 160. A connector 38, or a connector having a different cross section, may be inserted through the aperture 160 of the connector by applying pressure against the aperture 160 in the same manner described above. The flexible connector may be formed from a thinner material that the material used to form the flexible projections 142, 146, 150 of the first bore 140, the second bore 144 or the third bore 148 to allow the flexible projection to expand sufficiently to allow the passage of the connector and to contract after the passage of the connector so that the aperture 160 becomes too small to allow the connector to be retracted backwards through the aperture 160 without the use of a suitable tool such as tool 130 discussed above.

The present invention has been described above in terms of several preferred embodiments. Modifications and additions to these embodiments will become apparent to persons of ordinary skill in the art upon a reading of the above disclosure. It is intended that all such modifications and additions comprise a part of the present invention to the extent they fall within the scope of the several claims appended hereto.

What is claimed is:

1. A fiber optic adapter comprising:
   a mounting block having a first side having a first opening and a second side having a second opening and a through opening from the first opening to the second opening having a longitudinal axis, the through opening including a seat for receiving a body portion of a fiber optic connector inserted into the mounting block through the first opening and for limiting movement of a fiber optic connector in the through opening in a direction from the first opening toward the second opening, said through opening further including a sleeve-receiving portion with a shoulder within the through opening for limiting movement of a sleeve in the through opening in a direction from the second opening toward the first opening, said shoulder being formed as a narrow portion between the sleeve-receiving portion and the seat;
   a sleeve within the sleeve-receiving portion; and
   at least one flexible projection in the through opening having a first end at least partially defining an aperture in the through opening between the first opening and the seat, the aperture being smaller than the first opening,
   the at least one flexible projection being configured to flex away from a rest position and away from the longitudinal axis to allow the body portion of the fiber optic connector to move from the first opening past the at least one flexible projection to the seat, as a portion of the fiber optic connector slides into the sleeve, and the at least one flexible projection being configured to return toward the rest position, closer to the longitudinal axis, when the fiber optic connector reaches the seat so as to prevent the removal of the fiber optic connector through the first opening when the at least one flexible projection is in the rest position.

2. The fiber optic adapter of claim 1, wherein the at least one flexible projection comprises at least first and second flexible projections each having a second end connected to the mounting block wherein the at least one projection projects from the second end toward the longitudinal centerline.

3. The fiber optic adapter of claim 2, wherein the at least one flexible projection comprises a plurality of fingers.

4. The fiber optic adapter of claim 1, wherein the at least one flexible projection comprises a conical structure.

5. The fiber optic adapter of claim 1, wherein the mounting block comprises a cap connected to a retainer, and wherein the first opening is located in the retainer and the second opening and the seat are located in the cap.

6. The fiber optic adapter of claim 5 wherein:
the cap includes a first wall and a second wall and a plurality of through openings each extending from the first wall to the second wall, each of the through openings including a first opening in the first wall, the second opening in the second wall, a longitudinal axis, a tapered portion inward of the first opening and extending toward the longitudinal axis and forming the seat, a diameter of the narrow portion being less than a smallest diameter of the sleeve-receiving portion and less than a smallest diameter of the tapered portion; and
the retainer mounted against the cap, the retainer including a first wall spaced from the cap and having the first opening.

7. The fiber optic adapter of claim 6, wherein the retainer comprises a second wall spaced from the retainer first wall and abutting the first wall of the cap and a bore extending into the retainer from the second wall, wherein the at least one flexible projection is located in the bore.

8. The fiber optic adapter of claim 7, wherein the first opening of the retainer and the bore are coaxial.

9. The fiber optic adapter of claim 7, wherein the at least one projection comprises a conical structure.

10. The fiber optic adapter of claim 7, wherein the at least one projection comprises a plurality of fingers angled toward the longitudinal axis of the cap.

11. The fiber optic adapter of claim 7, wherein each of the at least one projection includes a connected end connected to the retainer and a free end spaced from the connected end, the free end being located between the connected end and the cap and being spaced from the cap when the retainer second wall abuts the first wall of the cap.

12. The fiber optic adapter of claim 7, including a fiber optic connector in the fiber optic adapter, the fiber optic connector comprising a distal portion, a body and a main portion, the distal portion being located in the sleeve, the body including a tapered wall seated in the seat and a stop wall perpendicular to a longitudinal axis of the fiber optic connector facing a free end of the at least one projection, and the main portion of the fiber optic connector extending through the first opening.

13. The fiber optic adapter of claim 12, wherein the distal end of the fiber optic connector extends through the second opening in the second wall of the cap outside the cap.

14. The fiber optic adapter of claim 1, including a fiber optic connector in the through opening, the fiber optic connector having a distal portion, a main portion and a body between the distal portion and the main portion and having a sidewall, the body having a diameter larger than a diameter of the distal portion and larger than a diameter of the main portion, the body including a tapered portion extending from the distal portion to the side wall and a stop wall perpendicular to a longitudinal axis of the fiber optic connector and extending from the main portion to the side wall, the tapered portion being received in the seat and the stop wall being spaced from the at least one projection, the diameter of the body being larger than the aperture.

15. The fiber optic adapter of claim 1, wherein the at least one flexible projection comprises means for allowing the passage of a connector in a first direction through the mounting block and for blocking the passage of the connector in a second direction opposite the first direction through the mounting block.

16. A fiber optic adapter comprising:
a mounting block having a first side having a first opening and a second side having a second opening and a through opening from the first opening to the second opening having a longitudinal axis, the through opening including first means for limiting movement of a fiber optic connector in the through opening in a direction from the first opening toward the second opening and second means for limiting movement of a sleeve in the through opening in a direction from the second opening toward the first opening;
a sleeve within the through opening; and
securing means in the through opening for allowing a fiber optic connector to be inserted into the through opening from the first opening as a portion of the fiber optic connector slides into the sleeve, while blocking the removal of the fiber optic connector through the first opening.

17. The fiber optic adapter of claim 16 wherein the securing means comprises at least one flexible projection having a free end defining an aperture having a diameter less than a diameter of the first opening.

18. The fiber optic adapter of claim 16, wherein the mounting block comprises a retainer mounted against a cap, the first opening being located in the retainer and the second opening being located in the cap, the first means for limiting movement comprising a seat in the cap facing the retainer, and the securing means comprising at least one flexible projection having a free end facing and spaced from the seat.

19. The fiber optic adapter of claim 18, including a fiber optic connector mounted in the fiber optic adapter with a body portion mounted in the seat and a stop wall facing the free end of the at least one flexible projection.

* * * * *